Jan. 10, 1933.   F. ALESSI   1,893,925
NAUTICAL PRECISION INSTRUMENT
Filed Oct. 19, 1929   2 Sheets-Sheet 1

Fred Alessi
INVENTOR

Aaron L. Applebaum
BY
ATTORNEY

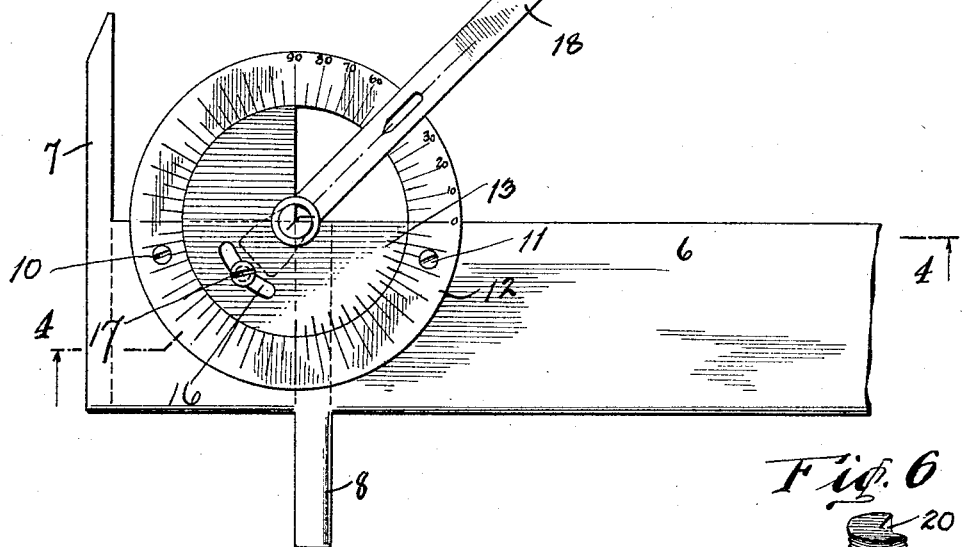
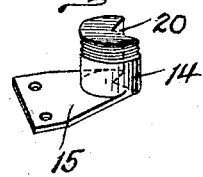
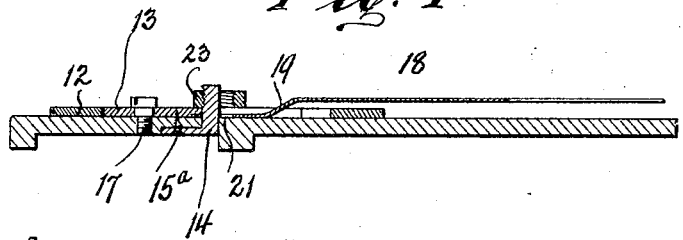
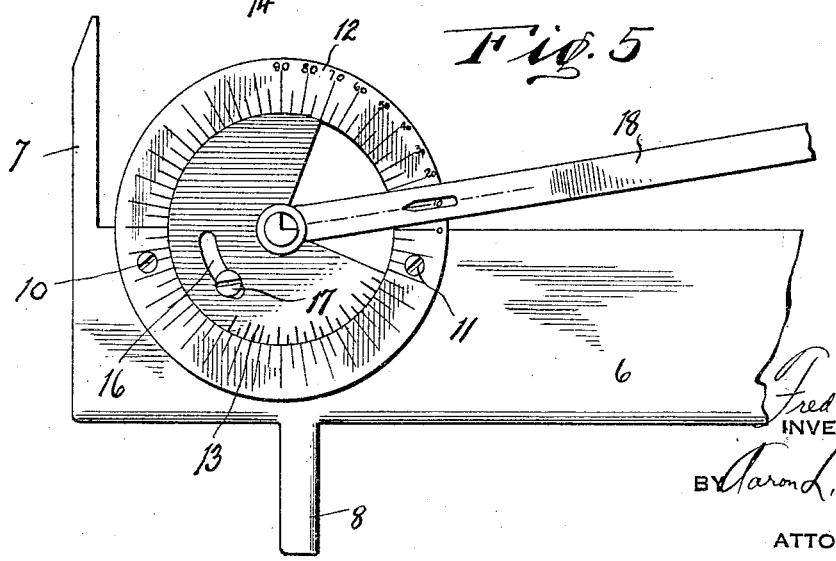

Patented Jan. 10, 1933

1,893,925

UNITED STATES PATENT OFFICE

FRED ALESSI, OF WOODRIDGE, NEW JERSEY

NAUTICAL PRECISION INSTRUMENT

Application filed October 19, 1929. Serial No. 400,948.

This invention relates to nautical instruments and more particularly to a direction compass to determine the course of a vessel according to the magnetic and true course between two positions.

One of the objects of my invention is to provide a direction compass for nautical charts in which the course of a vessel may be plotted according to astronomical observations with allowance for deviations in the magnetic and true course between two positions.

To enable others skilled in the art to more fully comprehend the underlying features of my invention, reference is had to the accompanying drawings forming a part of the specification in which Fig. 1 is a plan view showing the use of my invention.

Fig. 3 is an enlarged view showing the instrument.

Fig. 4 is a section taken on line 4—4 of Fig. 3.

Fig. 5 is a view similar to Fig. 3 showing the indicator and inside compass in a different position.

Fig. 6 is a detail of a threaded connecting stud.

Figure 1:
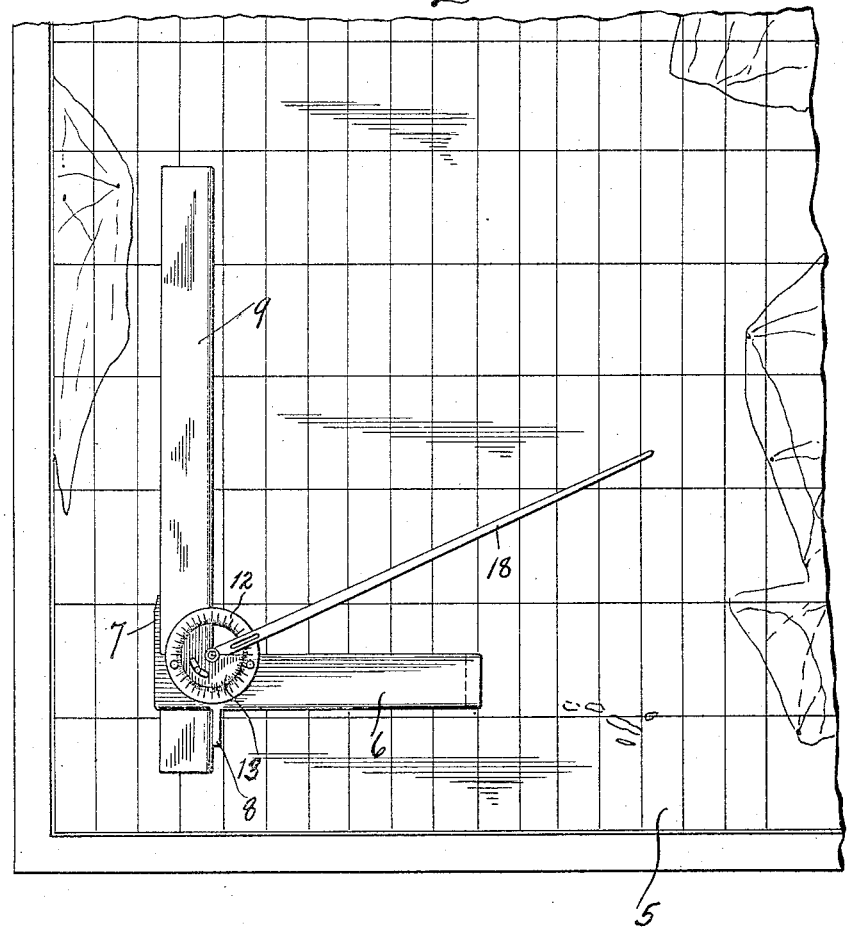
Figure 2:
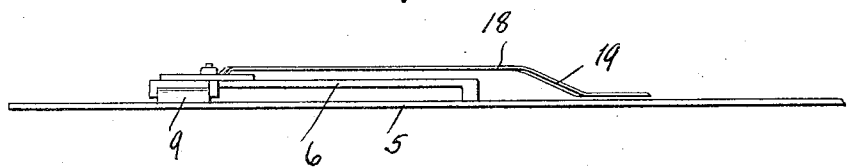
Fig. 2 is an elevation view.

Referring now to the drawings 5 designates a nautical chart graduated in degrees as to longitude and latitude. The instrument comprises a horizontal, flat, blade 6 similar to the blade of a T-square and formed with a right angle end extension 7 and an inwardly right angle spaced extension 8 depending from the bottom edge thereof. The extensions of the blade are spaced substantially the width of a rule or guide 9 so that the instrument may be conveniently moved and guided to any position along its length when positioned on a nautical chart as shown by Fig. 1.

Fixed to the blade by means of fastening screws 10, 11, I provide a protractor 12 graduated in degrees, which protractor is to be referred to as the true course protractor.

As shown by Figs. 3 and 4, the instrument also includes and provides an inner magnetic course protractor scale 13 which is also graduated in degrees. The scale 13 is loosely mounted on a stud 14 having a lateral flange 15 which is fastened to the bottom surface of the blade by screws 15a. A ninety degree sector is cut out of the scale 13 which is also provided with a segmental slot 16 that rides over a threaded screw 17 fastened to the blade and which limits the movement of the scale to approximately 22½ degrees. If so desired, the slot 16 may be continued to afford a greater circular movement but ordinarily this is not necessary for the course deviation as derived from astronomical observations is usually less than and seldom exceeds 22½ degrees.

On the stud, there is also provided the indicator or pointer 18 which is bent upwardly as at 19 to afford sufficient clearance for said indicator over the protractor scales 12 and 13. A nut 23 on the stud retains the indicator and scale 13 in position.

At this point it will be noted that a ninety degree sector is cut out of the stud as at 20 (Fig. 6) from top to bottom and that the indicator is also provided with a slot 21 whereby the instrument may be moved and set according to a given point or position. In other words, the sectors of the scale 13 and stud may coincide so that the instrument may be set at a point or position on the chart considered by the right angle as formed by the blade and the rule.

I proceed as follows in order to determine with my instrument upon a chart the true course, as well as the compass or magnetic course, between two points—one of which is, for instance, the point of destination and is marked as such in the chart, whereas the other is at the location of the observer and has been located upon said chart either by landmarks or by astronomical observations.

The observer can ascertain the declination of the compass in the latitude of the last mentioned point of his location; he knows the semi-circular deviation of the compass caused by the magnetism of his ship, and he therefore can determine for his point of observation the true angle of deviation of the compass. He sets the scale 13 in the protractor 12 to the right or left according to said error of the compass, and, to the extent to which graduations are provided upon the inner scale 13 of the instrument, he can read upon said scale the compass course corresponding to a true course selected upon the protractor 12.

The observer now places the guide 9 upon the chart, so that one edge thereof aligns with the meridian of the point of observation. The plate 6, which is rectangularly assembled upon the guide 9, is then slid, upon said guide, into alignment of its upper edge with the latitude of the point of observation, so that the center of the protractors 12 and 13 and the fulcrum of the indicator 18 register with the point of observation, and so that the sectors, which are cut out from the various parts of my instrument, are disposed from said fulcrum in a general direction towards the point of destination on the chart.

The indicator 18 is now swung around its fulcrum into the direction of the point of destination and the true course may now be read on the protractor 12. The compass or magnetic course in which a ship is to proceed from the point of observation to the point of destination may then be determined by reference to the position of scale 13.

While I have shown and described my invention with some degree of particularity, it will be realized that other modifications and changes may be resorted to under special conditions. I therefore do not wish to be limited and restricted to the exact details shown and described but reserve the right to make such changes and modifications as may fairly fall within the scope of the subject matter now being claimed.

Having shown and described my invention, what I claim as new and desire to secure by Letters Patent is:—

1. A nautical instrument comprising a blade slidably disposed on a rule, a protractor fixed to said blade, one half of said protractor extending over the edge of said blade, a second protractor concentrically movably cooperating with said fixed protractor, and a pointer fulcrumed at the common center of said protractors and radially extending therefrom.

2. A nautical instrument comprising a rule, a blade slidable on said rule, a protractor mounted upon said blade and concentric to the point of intersection of one edge of said rule with one edge of said blade, and a pointer fulcrumed at and substantially radially extending from said point of intersection.

3. A nautical instrument comprising a rule, a transversely grooved blade removably and slidably fitting over the top and sides of said rule, a pair of cooperating protractors relatively movably mounted upon said blade and concentric to the point of intersection of one edge of said rule with one edge of said blade, and a pointer fulcrumed at and substantially radially extending from said point of intersection.

4. A nautical instrument comprising a rule, a blade slidably on said rule, a pair of inner and outer cooperating protractors relatively movably mounted upon said blade and concentric to the point of intersection of one edge of said rule with one edge of said blade, a pointer fulcrumed at and substantially radially extending from said point of intersection, and a pivot substantially of the shape of a 270° sector rotatably supporting said pointer and clearing the angle between said edges of said rule and blade.

In testimony whereof I affix my signature.

FRED ALESSI.